US009145170B2

(12) United States Patent
Mori

(10) Patent No.: US 9,145,170 B2
(45) Date of Patent: Sep. 29, 2015

(54) FRAMEWORK MEMBER

(75) Inventor: Takeo Mori, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/353,100

(22) PCT Filed: Oct. 25, 2011

(86) PCT No.: PCT/JP2011/074576
§ 371 (c)(1),
(2), (4) Date: Apr. 21, 2014

(87) PCT Pub. No.: WO2013/061408
PCT Pub. Date: May 2, 2013

(65) Prior Publication Data
US 2014/0239671 A1 Aug. 28, 2014

(51) Int. Cl.
B62D 21/15 (2006.01)
F16F 7/12 (2006.01)

(52) U.S. Cl.
CPC ............... B62D 21/152 (2013.01); F16F 7/12 (2013.01)

(58) Field of Classification Search
CPC ...... B62D 21/15; B62D 21/152; B62D 21/02; F16F 7/12
USPC ............. 296/187.09, 187.1, 193.09, 203.02
See application file for complete search history.

(56) References Cited

U.S. PATENT DOCUMENTS

| 4,702,515 | A | 10/1987 | Kato et al. | |
| 7,185,945 | B2* | 3/2007 | Dandekar et al. | 296/187.09 |
| 8,585,129 | B2 | 11/2013 | Mori | |
| 2005/0151392 | A1 | 7/2005 | Yasukouchi et al. | |
| 2008/0098601 | A1* | 5/2008 | Heinz et al. | 29/897.2 |
| 2009/0236166 | A1* | 9/2009 | Kowaki et al. | 180/232 |
| 2010/0148526 | A1* | 6/2010 | Karlander | 293/155 |
| 2011/0309655 | A1 | 12/2011 | Mori | |

FOREIGN PATENT DOCUMENTS

| JP | A-61-287871 | | | 12/1986 |
| JP | 05105110 | A | * | 4/1993 |
| JP | A-05-105110 | | | 4/1993 |
| JP | 08188174 | A | * | 7/1996 |
| JP | A-08-188174 | | | 7/1996 |
| JP | A-2004-075021 | | | 3/2004 |
| JP | A-2005-199751 | | | 7/2005 |

(Continued)

Primary Examiner — Jason S Morrow
Assistant Examiner — E Turner Hicks
(74) Attorney, Agent, or Firm — Oliff PLC

(57) ABSTRACT

The present invention provides a framework member by which the amount of impact absorption can be sufficiently ensured. The framework member is a framework member that is extended in a front and rear direction of a vehicle in a front portion of the vehicle. A plurality of deformation-inducing portions, in which deformations are induced by a load exerted from a front of the vehicle, are formed at points in the framework member along the front and rear direction of the vehicle. The plurality of deformation-inducing portions are alternately formed on an outer side and an inner side of the framework member along the front and rear direction of the vehicle. The closer the deformation-inducting portion is positioned to a rear of the vehicle, the greater a distance between the deformation-inducing portions becomes.

2 Claims, 11 Drawing Sheets

(56) References Cited

FOREIGN PATENT DOCUMENTS

| JP | 2007112260 A | * | 5/2007 |
| JP | A-2007-112260 | | 5/2007 |
| JP | A-2007-283875 | | 11/2007 |
| JP | A-2010-221991 | | 10/2010 |

* cited by examiner (a)

(b)

FRAMEWORK MEMBER

TECHNICAL FIELD

The present invention relates to a framework member that is extended in a front and rear direction of a vehicle in a front portion of the vehicle.

BACKGROUND ART

In the related art, Patent Literature 1 discloses a framework member that transmits a load to a rear of a vehicle when the load is exerted on a front side of the vehicle due to a collision. In the framework member in Patent Literature 1, a buckling point is provided in a front and rear direction of the vehicle to control a deformation when a collision occurs. Specifically, the framework member has a buckling point which is formed on a lateral side of a powertrain unit such as an engine in a width direction of the vehicle; and a buckling point which is formed on a rear side of the buckling point on the lateral side. The framework member is deformed at each of the buckling points, and thus an impact is absorbed.

CITATION LIST

Patent Literature

[Patent Literature 1] Japanese Unexamined Patent Application Publication No. 2010-221991

SUMMARY OF INVENTION

Technical Problem

The framework member is bent at the buckling point on the front side, and thus, the framework is deformed to an inner side in the width direction of the vehicle and interferes with the powertrain unit at the position. A force is exerted to compress and deform the vicinity of a front portion (bumper reinforcement side further from the buckling point on the front side) of the framework member, and a force by which the framework member is pressed to the rear of the vehicle becomes weak. Accordingly, the amount of impact absorption by the framework member is reduced.

The present invention is made to solve the problem, and an object of the present invention is to provide a framework member by which the amount of impact absorption can be sufficiently ensured.

Solution to Problem

A framework member is extended in a front and rear direction of a vehicle in a front portion of the vehicle. A plurality of deformation-inducing portions, in which deformations are induced by a load exerted from a front of the vehicle, are formed at points in the framework member along the front and rear direction of the vehicle. The plurality of deformation-inducing portions are alternately formed on an outer side and an inner side of the framework member along the front and rear direction of the vehicle. The closer the deformation-inducting portion is positioned to a rear of the vehicle, the greater a distance between the deformation-inducing portions becomes.

When a load is exerted from the front of the vehicle due to a front end collision, the framework member is deformed toward the inner side in the vicinity of a powertrain unit such as an engine, and the framework member interferes with the powertrain unit. At this time, the framework member is deformed to be moved backward in a front portion thereof in which a distance between the deformation-inducing portions is small. That is, the amount of deformation can be ensured on a portion on a front side more than on a portion in which the framework member interferes with the powertrain unit. In addition, a force is transmitted to a portion on a rear side of the framework member by the deformation such that the framework member can be pressed toward a rear of the vehicle. Accordingly, the amount of deformation can also become larger on a portion on a rear side than a portion in which the framework member interferes with the powertrain unit. As such, the amount of impact absorption can be sufficiently ensured.

The deformation-inducing portion is formed in each of a front portion, a middle portion and a rear portion of the framework member, and deformations are induced in order of the middle portion, the front portion and the rear portion. After the impact is absorbed by a deformation of the middle portion, the framework member is moved backward by a deformation of the front portion. Accordingly, the load can be transmitted to the rear portion of the framework member.

The deformation-inducing portion has strength lower than other portions of the framework member and is configured to have a fragile portion which is buckled by a load. When the fragile portion formed on the outer side of the framework member is buckled, the framework member is bent to the inner side in the portion. When the fragile portion formed on the inner side of the framework member is buckled, the framework member is bent to the outer side in the portion.

The deformation-inducing portion is configured to have a bent portion which is bent by a load exerted from the front of the vehicle. The bent portion formed on the outer side of the framework member makes the framework member bend to the inner side in the portion. The bent portion formed on the inner side of the framework member makes the framework member bend to the outer side in the portion.

A first deformation-inducing portion, a second deformation-inducing portion and a third deformation-inducing portion are formed in the framework member in order of ascending number from the front of the vehicle. The third deformation-inducing portion is arranged at a position which is adjacent to a powertrain unit in a width direction of the vehicle. The first deformation-inducing portion is formed on the outer side of the framework member, and the framework member is bent toward the inner side at a position where the first deformation-inducing member is located. The second deformation-inducing portion is formed on the inner side of the framework member, and the framework member is bent toward the outer side at a position where the second deformation-inducing member is located. The third deformation-inducing portion is formed on the outer side of the framework member, and the framework member is bent toward the inner side at a position where the third deformation-inducing member is located. A distance between the first deformation-inducing portion and the second deformation-inducing portion in the front and rear direction of the vehicle is smaller than a distance between the second deformation-inducing portion and the third deformation-inducing portion in the front and rear direction of the vehicle.

When a load is exerted from the front side of the vehicle due to a front end collision, the framework member is deformed toward an inner side thereof at a position in which the third deformation-inducing portion is located in the vicinity of a powertrain unit such as an engine, and the framework member interferes with the powertrain unit. At this time, the framework member is deformed to be moved backward in the first and second deformation-inducing portions between which a distance is small. That is, the amount of deformation can be ensured in the portion. In addition, since the first deformation-inducing portion and the second deformation-inducing portion are alternately formed on the inner side and the outer side of the framework member, a stable deformation mode is obtained. In addition, a force is transmitted to a portion on the rear side of the framework member by the deformation such that the framework member can be pressed toward the rear of the vehicle. Accordingly, the amount of deformation can also become large in a portion on the rear side of the third deformation-inducing portion. As such, the amount of impact absorption can be sufficiently ensured.

A framework member is a framework member that is extended in a front and rear direction of a vehicle in a front portion of the vehicle. A rear-side area has strength higher than a front-side area in the front and rear direction of the vehicle. The front-side area has a front-side deformation-inducing portion in which a bending deformation is induced by a load exerted from a front of the vehicle, and the rear-side area has a rear-side deformation-inducing portion in which a bending deformation is induced by a load exerted from the front of the vehicle.

When a load is exerted from a front side of the vehicle due to a front end collision, the framework member is deformed toward an inner side thereof in the rear-side deformation-inducing portion in the vicinity of a powertrain unit such as an engine, and the framework member interferes with the powertrain unit. At this time, the framework member is deformed to be moved backward in the front-side deformation portion with low strength. That is, the amount of deformation can be ensured in the portion. In addition, a force is transmitted to a portion on a rear side of the framework member by the deformation such that the framework member can be pressed toward a rear of the vehicle. Accordingly, the amount of deformation can also become large in a portion on a rear side of the rear-side deformation-inducing portion which interferes with the powertrain unit. As such, the amount of impact absorption can be sufficiently ensured.

The front-side deformation-inducing portion has a bent portion formed on each of the outer side and the inner side of the framework member. The rear-side deformation-inducing portion has a bent portion provided in a reinforcement member that reinforces the rear-side area. The framework member is bent and deformed in the bent portion which is provided in the reinforcement member.

In the front-side deformation-inducing portion, a distance between the bent portion on the outer side and the bent portion on the inner side is set to be a cross-sectional width of the framework member. As such, when the distance between the bent portions in the front-side deformation-inducing portion is set to be small, a bending deformation can occur in the front-side deformation-inducing portion after a bending deformation can occur in the rear-side deformation-inducing portion.

A framework member is extended in a front and rear direction of a vehicle in a front portion of the vehicle. A front-side deformation-inducing portion, in which a bending deformation is induced by a load exerted from a front of the vehicle, is formed in each of an outer side and an inner side on a front side of a powertrain unit in the front and rear direction of the vehicle.

When a load is exerted from a front side of the vehicle due to a front end collision, the framework member is deformed toward the inner side in the vicinity of a powertrain unit, and the framework member interferes with the powertrain unit. At this time, the framework member is deformed to be moved backward in a portion on the front side of the powertrain unit. That is, the amount of deformation can be ensured in the portion. In addition, a force is transmitted to a portion on a rear side of the framework member by the deformation such that the framework member can be pressed toward a rear of the vehicle. Accordingly, the amount of deformation can also become larger on a portion on a rear side than on a portion in which the framework member interferes with the powertrain unit. As such, the amount of impact absorption can be sufficiently ensured.

Advantageous Effects of Invention

According to the present invention, the amount of impact absorption can be sufficiently ensured.

DESCRIPTION OF EMBODIMENTS

Hereinafter, suitable embodiments of a framework member according to the present invention will be described in detail with reference to the accompanying drawings.

First Embodiment

Figure 1:
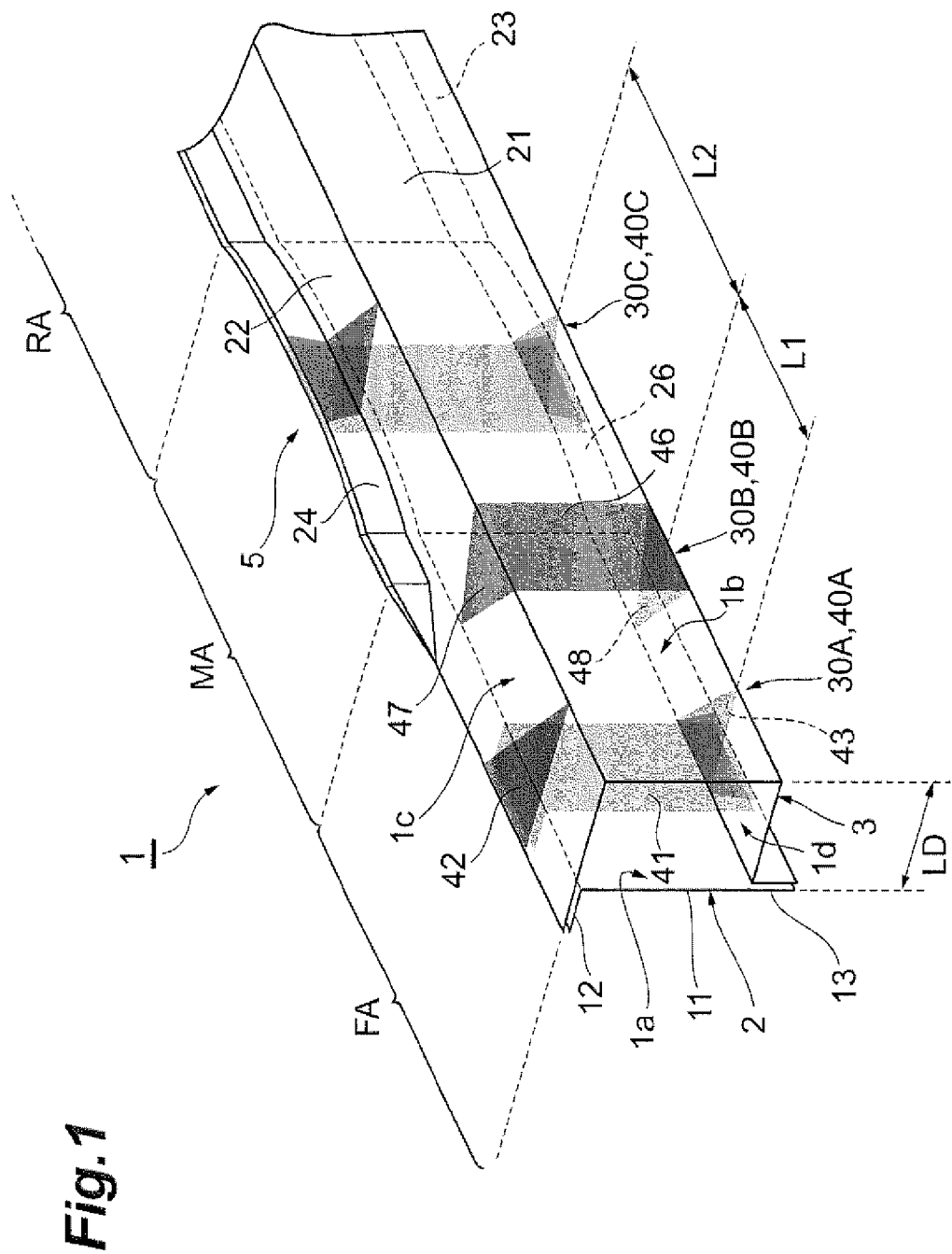
FIG. 1 is a perspective view illustrating a portion of a front side member according to a first embodiment.

A front side member 1 is a framework member that is extended in a front and rear direction of a vehicle in a front portion of the vehicle. A pair of the front side members 1 are provided in a width direction of the vehicle to support each of both end portions of a bumper reinforcement in the width direction of the vehicle in a front end portion. When a load is exerted on the bumper reinforcement due to a collision, the front side member 1 serves to absorb the load and transmit the load to a rear side of the vehicle. FIG. 1 illustrates only one of the pair of front side members 1. In addition, the thicknesses of members are small compared to the entire front side member, and the thickness of each of the members is not illustrated in FIG. 1. In FIG. 1, flange portions and the like are slightly apart from each other for easy understanding of the structure, but two of the members are practically in contact and jointed with each other from a structure standpoint.

Figure 7:
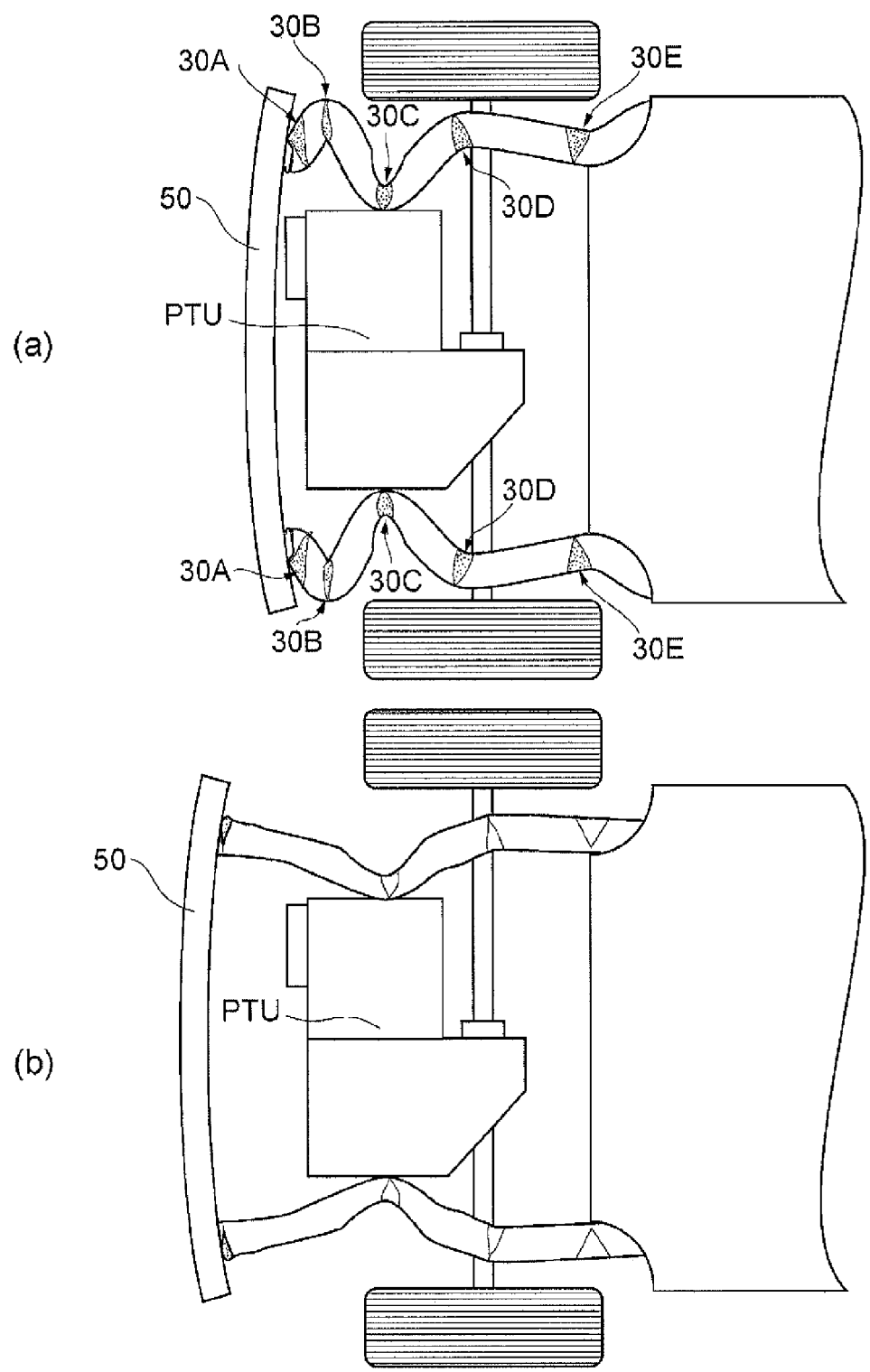
FIG. 7 shows other top views illustrating states of deformations of the front side member according to the embodiment and of the front side member according to the comparison example.

The front side member 1 is formed to have a substantially rectangular transverse section and has a side wall 1a on an outer side in the width direction of the vehicle and a side wall 1b, an upper wall 1c and a lower wall 1d on an inner side in the width direction of the vehicle. In addition, the front side member 1 has a front portion FA, a middle portion MA and a rear portion RA in the front and rear direction of the vehicle. In the embodiment, the middle portion MA indicates an area which is in the width direction of the vehicle adjacent to a powertrain unit PTU (refer to FIG. 3 or FIG. 7) which contains an engine and the like. The front portion FA is an area on a front side of the vehicle from the middle portion MA. The front portion FA is an area on a front side of the powertrain unit PTU in the front and rear direction of the vehicle. The rear portion RA is an area on the rear side of the vehicle from the middle portion MA.

The middle portion MA of the front side member 1 has a cross-section reduction portion 5 of which the cross-sectional area is reduced. In the cross-section reduction portion 5, the outer side of the front side member 1 is configured to be curved to the inner side thereof when seen from a top and bottom direction of the vehicle. Specifically, in the cross-section reduction portion 5, the side wall 1a on the outer side of the front side member 1 is curved to draw an arc when seen from the top and bottom direction of the vehicle. In the cross-section reduction portion 5, the side wall 1b on the inner side of the front side member 1 is not curved but extended straight.

As illustrated in FIG. 1, the front side member 1 is configured to alternately connect a front side member outer 2 and a front side member inner 3 with each other. The front side member outer 2 is a member that is extended in the front and rear direction of the vehicle. The front side member outer 2 is a member on the outer side of the front side member 1 and mainly configures the side wall 1a on the outer side of the front side member 1. The front side member inner 3 is a member that is extended in the front and rear direction of the vehicle. The front side member inner 3 is a member on the inner side of the front side member 1 and mainly configures the side wall 1b, the upper wall 1c and the lower wall 1d on the inner side of the front side member 1.

The front side member outer 2 includes a side wall portion 11, a flange portion 12 and a flange portion 13. The side wall portion 11 configures the side wall 1a on the outer side of the front side member 1. The flange portion 12 is formed in an edge portion on an upper side of the side wall portion 11 and is jointed with a flange portion 24 of the front side member inner 3. The flange portion 13 is formed in an edge portion on a lower side of the side wall portion 11 and is jointed with a flange portion 26 of the front side member inner 3. For example, a long flat plate is subject to a bending process or a press process to form the side wall portion 11, the flange portion 12 and the flange portion 13 of the front side member outer 2.

The front side member inner 3 includes a side wall portion 21, an upper wall portion 22, a lower wall portion 23, the flange portion 24 and the flange portion 26. The side wall portion 21 configures the side wall 1b on the inner side of the front side member 1. The upper wall portion 22 configures the upper wall 1c of the front side member 1. The lower wall portion 23 configures the lower wall 1d of the front side member 1. The flange portion 24 is formed in an edge portion on an outer side of the upper wall portion 22 and is jointed with the flange portion 12 of the front side member outer 2. The flange portion 26 is formed in an edge portion on an outer side of the lower wall portion 23 and is jointed with the flange portion 13 of the front side member outer 2. For example, a long flat plate is subject to a bending process or a press process to form the side wall portion 21, the upper wall portion 22 the lower wall portion 23, the flange portion 24 and the flange portion 26 of the front side member inner 3.

The flange portions 12 and 24 on an upper side of the front portion FA of the front side member 1 are extended in the front and rear direction of the vehicle in a state where the flange portions 12 and 24 are horizontally broadened. That is, the flange portion 12 is horizontally bent from an upper edge of the side wall portion 11. The flange portion 24 is straight horizontally extended from the edge portion on the outer side of the upper wall portion 22. The flange portions 12 and 24 on upper sides of the middle portion MA and the rear portion RA of the front side member 1 are extended in the front and rear direction of the vehicle in a state where the flange portions 12 and 24 are vertically broadened. That is, the flange portion 12 is bent straight upward from an upper edge of the side wall portion 11. The flange portion 24 is bent upward from the edge portion on the outer side of the upper wall portion 22. The flange portions 13 and 26 on lower sides of the front portion FA, the middle portion MA and the rear portion RA of the front side member 1 are extended in the front and rear direction of the vehicle in a state where the flange portions 13 and 26 are vertically broadened. That is, the flange portion 13 is extended straight downward from a lower edge of the side wall portion 11. The flange portion 26 is bent downward from the edge portion on the outer side of the lower wall portion 23.

The side wall portion 11, the flange portion 12 and the flange portion 13 of the front side member outer 2 are curved to draw an arc in the cross-section reduction portion 5 when seen from the top and bottom direction of the vehicle. The flange portions 24 and 26 of the front side member inner 3 are also curved to correspond to the arc shape. The edge portions on the inner sides of the upper wall portion 22 and the lower wall portion 23 of the front side member inner 3 are also curved to correspond to the arc shape.

The front side member 1 has deformation-inducing portions 30A, 30B, 30C, 30D and 30E in the front and rear direction of the vehicle in which deformations are induced by a load exerted from the front of the vehicle. Bending deformations are induced in the deformation-inducing portions 30A, 30B, 30C, 30D and 30E in a horizontal direction of the front side member 1 (that is, bending deformations around an axis line which is extended in the top and bottom direction of the vehicle). The deformation-inducing portions 30A, 30B, 30C, 30D and 30E are formed in the front side member 1 in order of ascending number from the front of the vehicle (refer to FIG. 3). The deformation-inducing portions 30A and 30B are formed in the front portion FA of the front side member 1. The deformation-inducing portion 30C is formed in the middle portion MA of the front side member 1. The deformation-inducing portions 30D and 30E are formed in the rear portion RA of the front side member 1.

In addition, the deformation-inducing portions 30A, 30B, 30C, 30D and 30E are alternately formed on the outer side and the inner side of the front side member 1 in the front and rear direction of the vehicle. The deformation-inducing portion 30A is formed on the outer side of the front side member 1. The deformation-inducing portion 30B is formed on the inner side of the front side member 1. The deformation-inducing portion 30C is formed on the outer side of the front side member 1. The deformation-inducing portion 30D is formed on the inner side of the front side member 1. The deformation-inducing portion 30E is formed on the outer side of the front side member 1. Accordingly, the front side member 1 is alternately deformed on the outer side and the inner side thereof. That is, the front side member 1 is bent toward the inner side at a position where the deformation-inducing portion 30A is located; the front side member 1 is bent toward the outer side at a position where the deformation-inducing portion 30B is located; the front side member 1 is bent toward the inner side at a position where the deformation-inducing portion 30C is located; the front side member 1 is bent toward the outer side at a position where the deformation-inducing portion 30D is located; and the front side member 1 is bent toward the inner side at a position where the deformation-inducing portion 30E is located. The phrase "the front side member 1 is bent toward the inner side" indicates that the front side member 1 is bent to form a convexity on the inner side in such a manner that mountains are formed in the side wall 1b on the inner side of the front side member 1 and valleys are formed on the side wall 1a on the outer side thereof. The phrase that "the front side member 1 is bent toward the outer side" indicates that the front side member 1 is bent to form a convexity on the outer side in such a manner that mountains are formed in the side wall 1a on the outer side of the front side member 1 and valleys are formed in the side wall 1b on the inner side thereof.

The deformation-inducing portions 30A, 30B, 30C, 30D and 30E are configured to have fragile portions 40A, 40B, 40C, 40D and 40E which are buckled by a load. The fragile portions 40A, 40B, 40C, 40D and 40E have buckling strength lower than other portions (portions of the front side member 1 other than the fragile portions 40A, 40B, 40C, 40D and 40E). The fragile portions 40A, 40B, 40C, 40D and 40E are preferably set to have buckling strength which is lower than the other portions by 20% or more. For example, a super high-tension material or a tailored blank material is used as a material for the front side member 1. Portions in the front side member 1 are subject to a heat treatment (annealing) and are decreased in strength, and thus, the fragile portions 40A, 40B, 40C, 40D and 40E are formed. Or, a low strength material is partially used to decrease strength. The fragile portions 40D and 40E are set to have buckling strength higher than the fragile portions 40A, 40B and 40C. Accordingly, the deformation-inducing portions 30D and 30E are deformed after the deformation-inducing portions 30A, 30B and 30C are deformed.

The fragile portion 40A configuring the deformation-inducing portion 30A makes the outer side of the front side member 1 likely to be buckled compared to the inner side thereof. Specifically, the fragile portion 40A is configured to have a side portion 41 formed in the front side member outer 2 and an upper portion 42 and a lower portion 43 formed in the front side member inner 3. The rectangular side portion 41 is formed to have a constant width (size in the front and rear direction of the vehicle) in the front side member outer 2 across the flange portion 12, the side wall portion 11 and the flange portion 13. The upper portion 42 is formed in the front side member inner 3 to have the shape of a triangle which has an apex portion in the edge portion on the inner side of the upper wall portion 22 and a base portion in an outer edge portion of the flange portion 24. In addition, the lower portion 43 is formed in the front side member inner 3 to have the shape of a triangle which has an apex portion in the edge portion on the inner side of the lower wall portion 23 and a base portion in the outer edge portion of the flange portion 26. The base portions of the upper portion 42 and the lower portion 43 are arranged at the same position where the side portion 41 is located, and the base portions of the upper portion 42 and the lower portion 43 are formed to have a substantially same size as the width (size in the front and rear direction of the vehicle) of the side portion 41. Accordingly, the fragile portion 40A has a portion which is formed to have a rectangular shape in the side wall 1a on the outer side of the front side member 1; and portions which are configured to have a triangular shape in the upper wall 1c and the lower wall 1d. The triangles in the upper wall 1c and the lower wall 1d are formed to have the base portions arranged on the outer side which is required to be weak. The fragile portion 40C which configures the deformation-inducing portion 30C has the same configuration as that of the fragile portion 40A, and the fragile portion 40E which configures the deformation-inducing portion 30E has the same configuration as that of the fragile portion 40A. As long as the deformation-inducing portion 30E in the rear portion RA is configured to be bending deformable (for example, a bent portion such as a bead is provided on the outer side), the deformation-inducing portion 30E may not have a structure in which a deformation is caused by the buckling of the fragile portion 40E.

The fragile portion 40B configuring the deformation-inducing portion 30B makes the inner side of the front side member 1 likely to be buckled compared to the outer side thereof. Specifically, the fragile portion 40B is configured to have a side portion 46, an upper portion 47 and a lower portion 48 formed in the front side member inner 3. The rectangular side portion 46 is formed to have a constant width (size in the front and rear direction of the vehicle) in the front side member inner 3 across the side wall portion 21 in the top and bottom direction of the vehicle. The upper portion 47 is formed in the front side member inner 3 to have the shape of a triangle which has an apex portion in the edge portion (or, may be the outer edge portion of the flange portion 24) on the outer side of the upper wall portion 22 and a base portion in the edge portion on the inner side of the upper wall portion 22. In addition, the lower portion 48 is formed in the front side member inner 3 to have the shape of a triangle which has an apex portion in the edge portion (or, may be the outer edge portion of the flange portion 26) on the outer side of the lower wall portion 23 and a base portion in the edge portion on the inner side of the lower wall portion 23. The base portions of the upper portion 47 and the lower portion 48 are arranged at the same position where the side portion 46 is located, and the base portions of the upper portion 47 and the lower portion 48 are formed to have a substantially same size as the width (size in the front and rear direction of the vehicle) of the side portion 46. Accordingly, the fragile portion 40B has a portion which is formed to have a rectangular shape in the side wall 1b on the inner side of the front side member 1; and portions which are configured to have a triangular shape in the upper wall 1c and the lower wall 1d. The triangles in the upper wall 1c and the lower wall 1d are formed to have the base portions arranged on the inner side which is required to be weak. The fragile portion 40D which configures the deformation-inducing portion 30D has the same configuration as that of the fragile portion 40B. As long as the deformation-inducing portion 30D in the rear portion RA is configured to be bending deformable (for example, a bent portion such as a bead is provided on the inner side), the deformation-inducing portion 30D may not have a structure in which a deformation is caused by the buckling of the fragile portion 40D.

Figure 3:
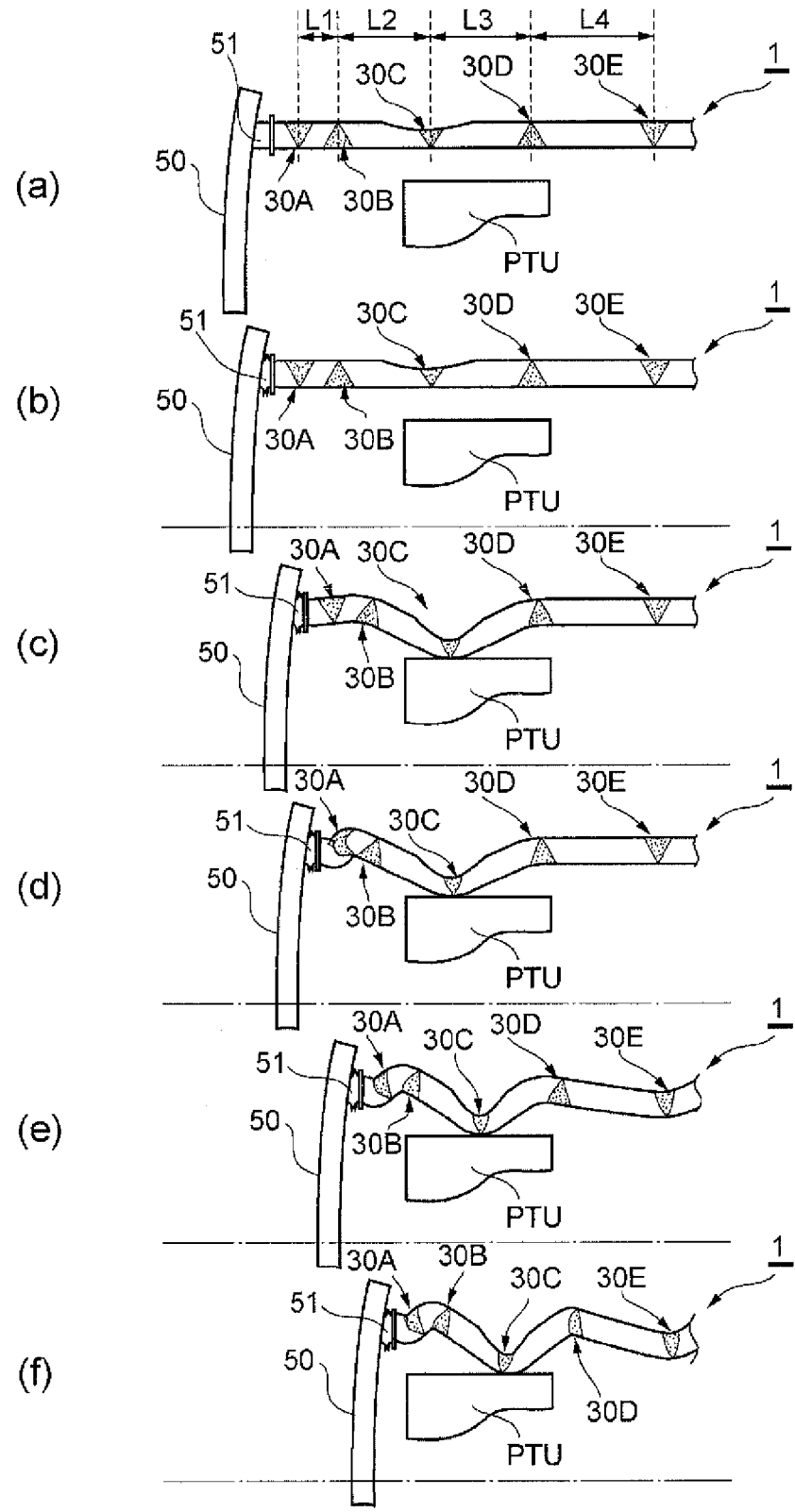
FIG. 3 shows schematic views illustrating the order in which each deformation occurs in the deformation-inducing portions.
Figure 6:
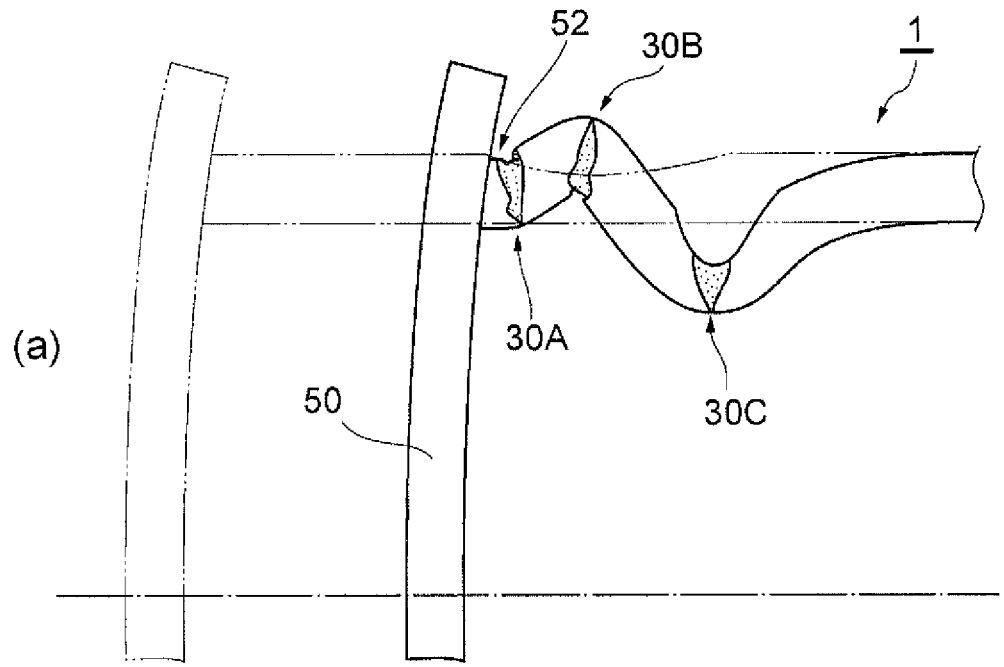
FIG. 6 shows top views illustrating states of deformations of the front side member according to the embodiment and of the front side member according to the comparison example.
Figure 6:
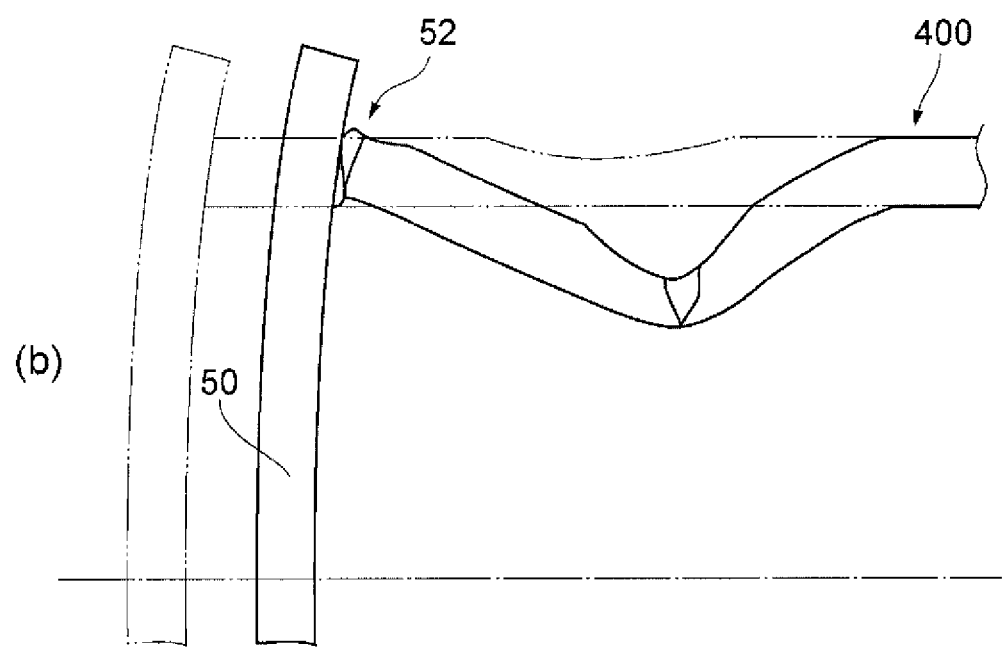

When a load is exerted on the front side member 1 from the front of the vehicle, the side portions 41 of the fragile portion 40 are buckled and collapsed in the deformation-inducing portions 30A, 30C and 30E, and the base portion sides of the upper portions 42 and the lower portions 43 are buckled and collapsed. Accordingly, the front side member 1 is bent toward the inner side at the positions where the deformation-inducing portions 30A, 30C and 30E are located. In addition, in the deformation-inducing portions 30B and 30D, the side portions 46 of the fragile portion 40 are buckled and collapsed, and the base portion sides of the upper portions 47 and the lower portions 48 are buckled and collapsed. Accordingly, the front side member 1 is bent toward the outer side at the positions where the deformation-inducing portions 30B and 30D are located. As such, as illustrated in FIG. 3 or FIG. 6(a), the front side member 1 is deformed to have a zigzag shape on a horizontal surface. The front side member 1 is subject to a bending deformation even in the front portion FA of the vehicle, and thus, a stable deformation mode can be achieved.

The closer the deformation-inducting portion in the respective deformation-inducing portions 30A, 30B, 30C, 30D and 30E is positioned to the rear of the vehicle, the greater a distance between the deformation-inducing portions which are adjacent to each other in the front and rear direction of the vehicle becomes. That is, a distance L2 between the deformation-inducing portions 30C and 30B is greater than a distance L1 between the deformation-inducing portions 30B and 30A. A distance L3 between the deformation-inducing portions 30D and 30C is greater than the distance L2 between the deformation-inducing portions 30C and 30B. A distance L4 between the deformation-inducing portions 30E and 30D is greater than the distance L3 between the deformation-inducing portions 30D and 30C. Each of the distances is a distance between a center position in a deformation-inducing portion in the front and rear direction of the vehicle and a center position in an adjacent deformation-inducing portion in the front and rear direction of the vehicle.

Specifically, the distance L1 between the deformation-inducing portions 30B and 30A is preferably set to be the same size as a cross-sectional width LD of the front side member 1. The distance L2 between the deformation-inducing portions 30C and 30B is preferably set to be three times or more the distance L1. Or, in a case where the front side member 1 has the cross-section reduction portion 5 as in the embodiment, the deformation-inducing portion 30C is preferably provided in the maximum cross-section reduction position (position where the cross-sectional width becomes the smallest).

Subsequently, a modification of the front side member 1 with the above-mentioned configuration will be described.

Figure 2:
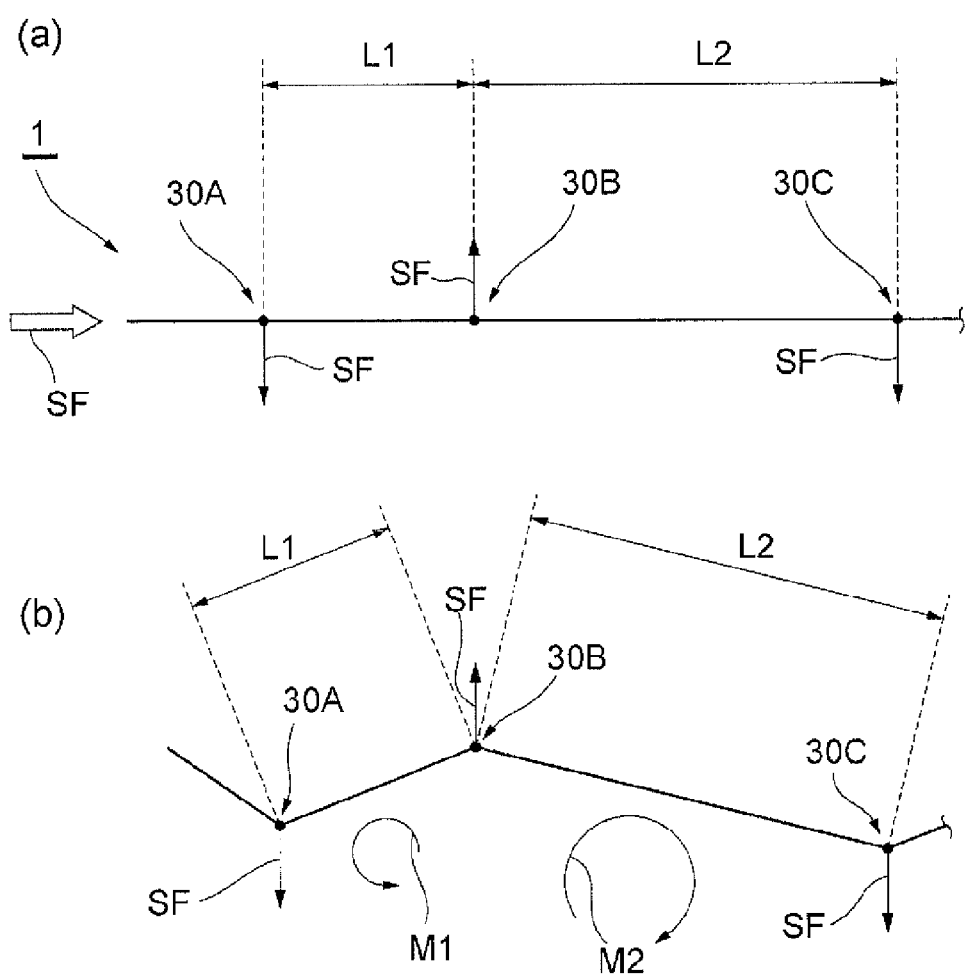
FIG. 2 illustrates model diagrams describing an order in which each deformation occurs in deformation-inducing portions.

The distance L2 between the deformation-inducing portions 30C and 30B is greater than a distance L1 between the deformation-inducing portions 30B and 30A. Accordingly, when a load is exerted on the front side member 1 from the front of the vehicle, the deformation-inducing portions 30C and 30B are first deformed and then the deformation-inducing portion 30A is deformed. When a load F is exerted on the front side member 1 as illustrated in a model diagram in FIG. 2(a), a force SF is exerted on the deformation-inducing portions 30A and 30C in such a manner that the front side member 1 is bent to the inner side, and the force SF is exerted on the deformation-inducing portion 30B in such a manner that the front side member 1 is bent to the outer side. The size of the force SF exerted on each of the deformation-inducing portions 30A, 30B and 30C is the same. However, the distance L2 between the deformation-inducing portions 30C and 30B is greater than the distance L1 between the deformation-inducing portions 30B and 30A. Accordingly, when the deformation-inducing portion 30B is set as a reference point, a momentum M2 on the deformation-inducing portion 30C side with the large distance L2 is larger than a momentum M1 on the deformation-inducing portion 30A with the small distance L1. As such, the deformation-inducing portions 30C and 30B are first deformed and then the deformation-inducing portion 30A is deformed.

When the front side member 1 is seen in its entirety, the front side member 1 is deformed in order as illustrated in FIG. 3. As illustrated in FIG. 3(a), a bumper reinforcement 50 is connected to a front end of the front side member 1 via a crash box 51. As illustrated in FIG. 3(b), when a load is exerted on the bumper reinforcement 50, the crash box 51 is first collapsed.

Subsequently, as illustrated in FIG. 3(c), the deformation-inducing portions 30B and 30C are deformed. That is, the front side member 1 is bent toward the inner side at a position where the deformation-inducing portion 30C is located, and the front side member 1 is bent toward the outer side at a position where the deformation-inducing portion 30B is located. For the above-mentioned reason, the deformation-inducing portions 30B and 30C are deformed in advance of the deformation-inducing portion 30A. At this time, the deformation-inducing portion 30C is moved to the inner side due to a bending deformation, and thus, the deformation-inducing portion 30C collides with a side surface of the powertrain unit PTU.

Subsequently, as illustrated in FIG. 3(d), the deformation-inducing portion 30A is deformed. That is, the front side member 1 is bent toward the inner side at a position where the deformation-inducing portion 30A is located. In addition, the front side member 1 continues to be deformed even in the deformation-inducing portion 30B. Accordingly, the bumper reinforcement 50 is smoothly moved to the rear of the vehicle. In addition, a force is transmitted to the rear portion RA to press the front side member 1 to the rear of the vehicle. The deformation-inducing portions 30D and 30E are set to have buckling strength higher than the deformation-inducing portions 30A, 30B and 30C. Accordingly, deformations in the deformation-inducing portions 30A, 30B and 30C occur earlier than deformations in the deformation-inducing portions 30D and 30E.

Subsequently, as illustrated in FIG. 3(e), the deformation-inducing portions 30D and 30E are deformed. That is, the front side member 1 is bent toward the outer side at a position where the deformation-inducing portion 30D is located, and the front side member 1 is bent toward the inner side at a position where the deformation-inducing portion 30E is located. In addition, the front side member 1 continues to be deformed even in the deformation-inducing portion 30C. The deformation-inducing portion 30C is moved to the rear of the vehicle even after the deformation-inducing portion 30C interferes with the powertrain unit PTU. The deformations in various deformation-inducing portions progress and eventually enter a state as illustrated in FIG. 3(f).

Figure 4:
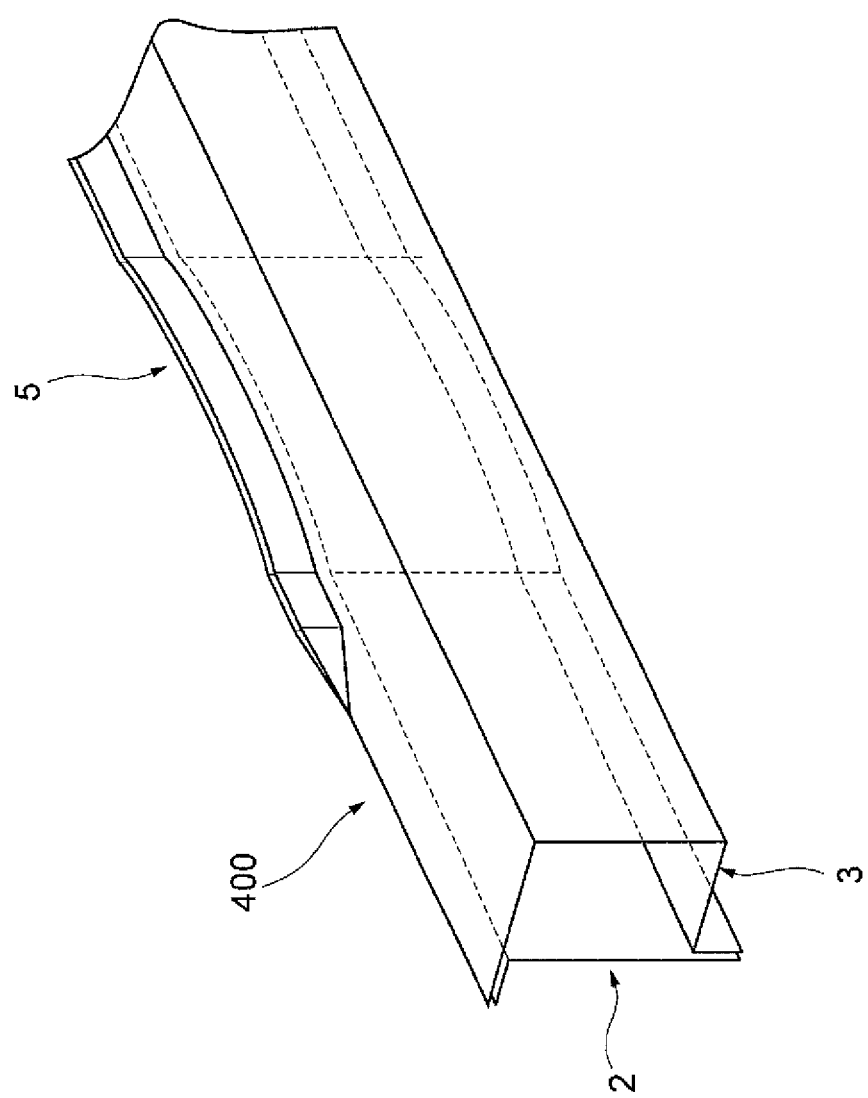
FIG. 4 is a perspective view illustrating a portion of a front side member according to a comparison example.
Figure 5:
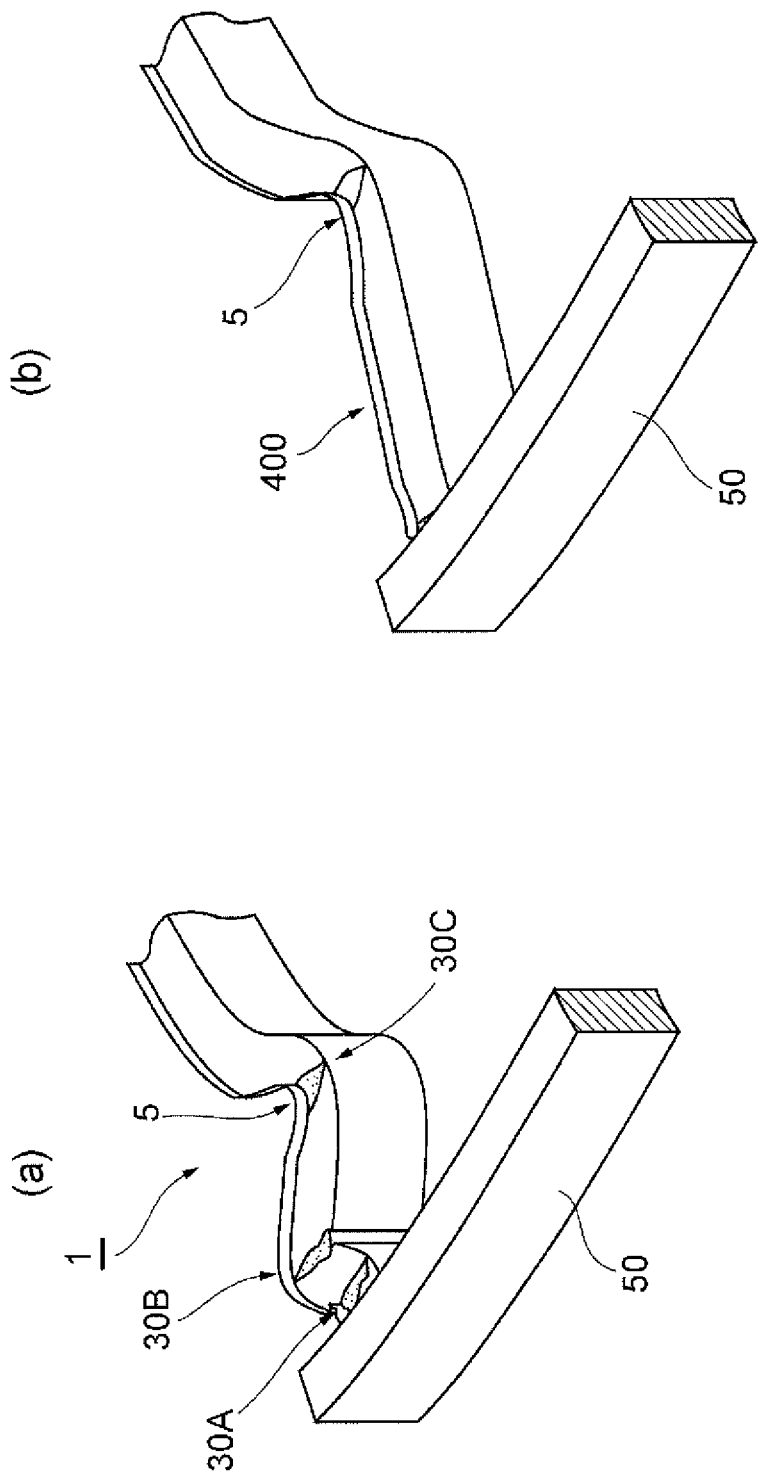
FIG. 5 shows perspective views illustrating manners of deformations of the front side member according to the embodiment and of the front side member according to the comparison example.

A front side member 400 which is illustrated in FIG. 4 is exemplified as a structure according to a comparison example. The front side member 400 has the cross-section reduction portion 5, but the front side member 400 does not have the deformation-inducing portions 30A, 30B and 30C as illustrated in the embodiment. When a load is exerted on the bumper reinforcement 50 as illustrated in FIGS. 5(b) and 6(b), the front side member 400 with this structure according to the comparison example is bent to an inner side in a portion where the cross-section reduction portion 5 is located (the front side member 400 is deformed at a substantially same position where the deformation-inducing portion 30C according to the embodiment is located). On the other hand, the front side member 400 is deformed in a connection portion 52 in which the front side member 400 is connected to the bumper reinforcement 50, but the front side member 400 is not bent to withstand the load in a front portion of the vehicle. As such, the connection portion 52 is subject to a large change of angle, and the front side member 400 according to the comparison example is deformed in an unstable deformation mode. In FIGS. 5(b) and 6(b), the crash box 51 is omitted in order to make a deformation mode of the front side member 400 clear.

In FIG. 7(b), a manner of deformation of the front side member 400 according to the comparison example is illustrated in more detail. As illustrated in FIG. 7(b), the front side member 400 is bent in the cross-section reduction portion 5 and interferes with the powertrain unit PTU. At this time, the bent front side member 400 interferes with the powertrain unit PTU, and a front portion of the front side member 400 withstands a load not to be bent. Accordingly, a force by which the front side member 400 is pressed to the rear of the vehicle becomes weak whereas a force is exerted in such a manner that the front side member 400 presses the powertrain unit PTU to the inner side. Accordingly, a deformation (deformations in the deformation-inducing portions 30D and 30E) of a rear portion of the front side member 400 is inhibited, and the amount of impact absorption becomes small. In addition, the deformation of the front side member 400 becomes unstable. As illustrated in FIG. 6(b), it is not possible for the front side member 400 to have a large stroke of deformation (distance between positions where the bumper reinforcement 50 is located before and after the bumper reinforcement 50 is subject to a deformation).

As illustrated in FIGS. 5(a) and 6(a), not only is the front side member 1 according to the embodiment bent to the inner side in the deformation-inducing portion 30C; but the front side member 1 is also bent to the outer side in the vicinity of the bumper reinforcement 50 and in the deformation-inducing portion 30B and is bent to the inner side in the deformation-inducing portion 30A. At this time, since the distance L2 between the deformation-inducing portions 30B and 30C is greater than the distance L1 between the deformation-inducing portions 30A and 30B, a deformation in the deformation-inducing portion 30C occurs in advance of a deformation in the deformation-inducting portion 30A. The front side member 1 is subject to a bending deformation in a zigzag shape at three points on the front portion side, and thus, the amounts of deformation in the portions are increased due to the articulated front side member 1 and the amount of energy absorption becomes large. In addition, the connection portion 52 is a portion where the front side member 1 and the bumper reinforcement 50 are connected to each other, and the connection portion 52 is not subject to a large change of angle as illustrated in the comparison example and is stably moved to the rear of the vehicle as it is while being kept in a position.

In FIG. 7(a), a manner of deformation of the front side member 1 according to the embodiment is illustrated in more detail. As illustrated in FIG. 7(a), the front side member 1 is bent in the deformation-inducing portion 30C (cross-section reduction portion 5) and interferes with the powertrain unit PTU. At this time, the bent front side member 1 interferes with the powertrain unit PTU, and the front portion of the front side member 1 is bent in the deformation-inducing portions 30B and 30A. Accordingly, even after the front side member 1 interferes with the powertrain unit PTU in the deformation-inducing portion 30C, the front side member 1 is deformed in the deformation-inducing portions 30A and 30B, and thus, a force is transmitted to stably press the front side member 1 to the rear of the vehicle (powertrain unit PTU is not pressed to the inner side in the deformation-inducing portion 30C in the width direction of the vehicle, different from the modification example) and the front side member 1 is certainly deformed in the deformation-inducing portions 30D and 30E. As such, the front side member 1 is deformed in the deformation-inducing portions 30A and 30B and, in addition, the amounts of deformation can also be certainly ensured in the deformation-inducing portions 30D and 30E. Accordingly, the amount of impact absorption is increased. In addition, the front side member 1 is stably deformed. As illustrated in FIG. 6(a), it is possible for the front side member 1 to have a large stroke of deformation (distance between positions where the bumper reinforcement 50 is located before and after the bumper reinforcement 50 is subject to a deformation) compared to the comparison example, Accordingly, when a collision occurs, the amount of impact absorption is sufficiently ensured in the front side member 1, and thus, a structural strength on the rear side of a vehicle body can be increased and an increase in vehicle weight can be prevented. In addition, a deformation mode can be stabilized by an articulated deformation.

As such, when a load is exerted from the front of the vehicle due to a front end collision, the front side member 1 is deformed toward the inner side in the deformation-inducing portion 30C in the vicinity of the powertrain unit PTU such as an engine, and the front side member 1 interferes with the powertrain unit PTU. At this time, the front side member 1 is deformed to be moved backward in the front portion in which a distance between the deformation-inducing portions is small. That is, the amount of deformation can be ensured on the portion. In addition, a force is transmitted to a portion on the rear side of the front side member 1 by the deformation such that the front side member 1 can be pressed toward the rear of the vehicle. Accordingly, the amount of deformation can become also larger on the portion on the rear side than the portion in which the front side member 1 interferes with the powertrain unit PTU. As such, the amount of impact absorption can be sufficiently ensured.

Second Embodiment

A front side member 100 according to a second embodiment will be described with reference to FIGS. 8 and 9. The front side member 100 according to the second embodiment is different from the front side member 1 according to the first embodiment mainly in that the front side member 100 has a fragile portion 140 formed of a member that is separate from the front side member 100.

Figure 8:
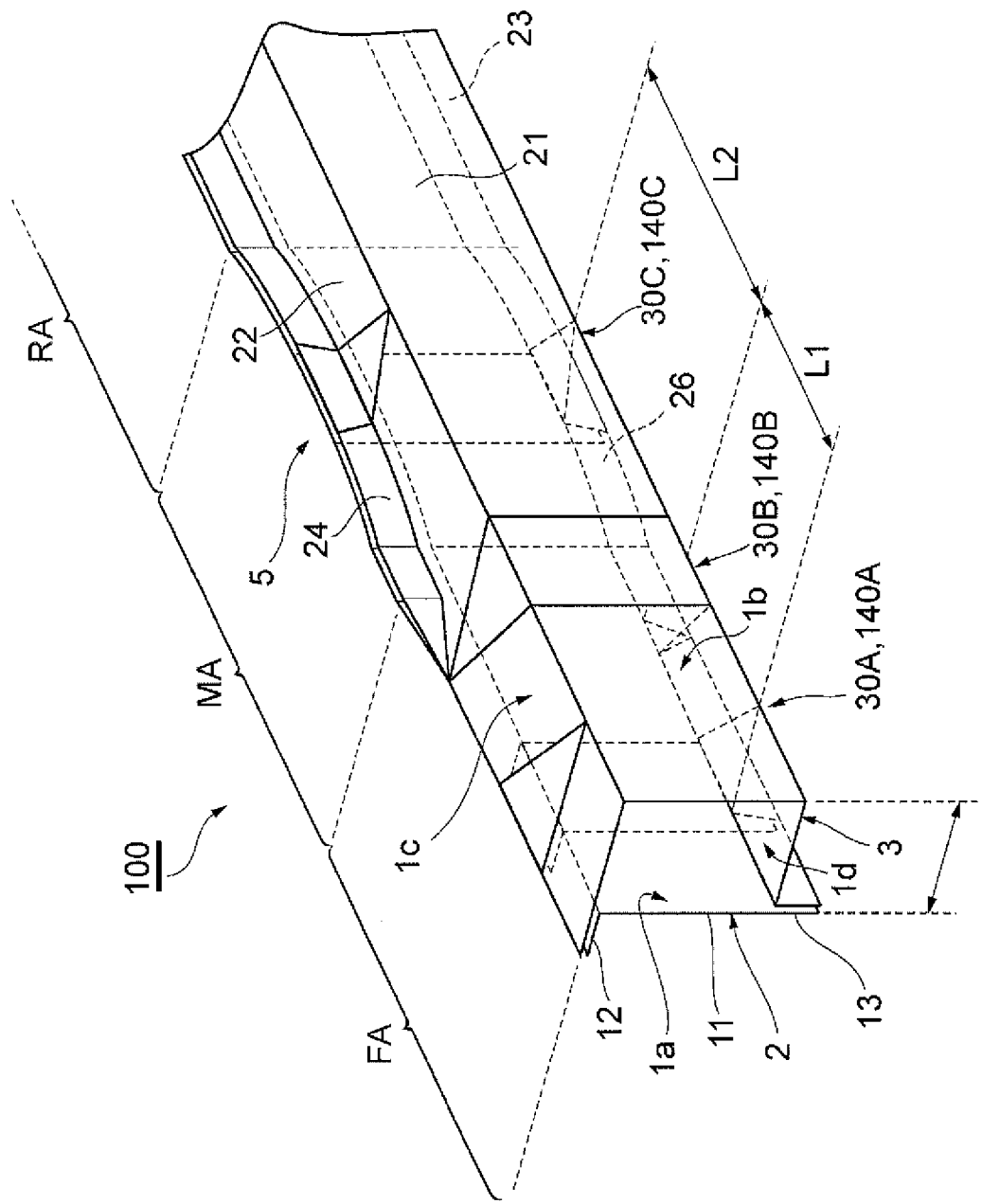
FIG. 8 is a perspective view illustrating a portion of a front side member according to a second embodiment.
Figure 9:
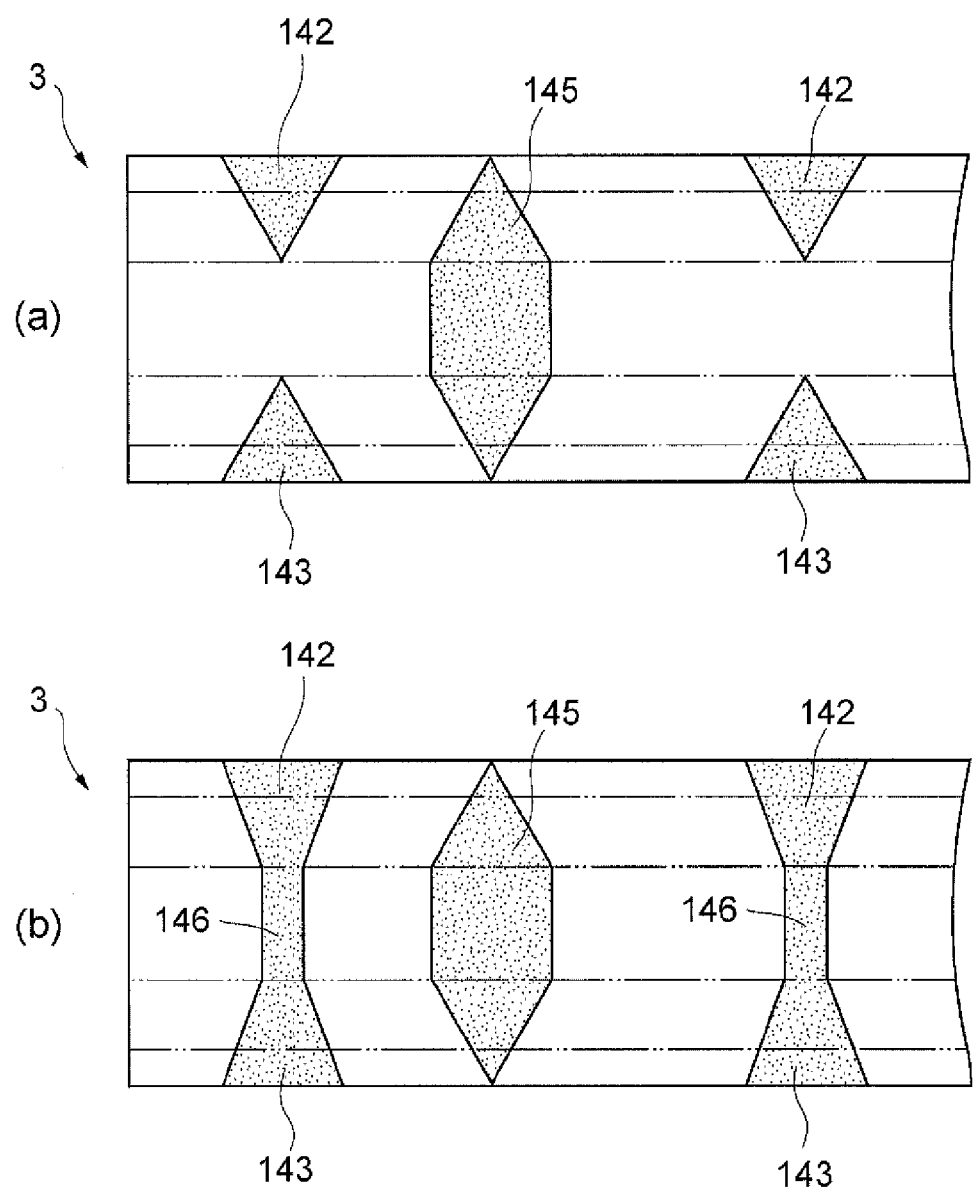
FIG. 9 illustrates a front side member inner which is unfolded into a flat plate state.

As illustrated in FIG. 8, fragile portions 140A, 140B and 140C of the front side member 100 are configured to be made of members with strength lower than a material used for other portions. The fragile portions 140A, 140B and 140C are substantially the same in position, shape and size as the fragile portions 40A, 40B and 40C of the front side member 1 according to the first embodiment. The deformation-inducing portions 30A, 30B and 30C are configured to have the fragile portions 140A, 140B and 140C. The deformation-inducing portions 30D and 30E may be configured to have fragile portions made of members that are separate from the front side member 100.

For example, the fragile portions 140A, 140B and 140C are formed by use of a tailored blank welding. That is, portions which are relevant to the fragile portions 140A, 140B and 140C in the front side member outer 2 and the front side member inner 3 are cut off. The low-strength members separate from the front side member 100 are welded to the cut-off portions to configure the fragile portions 140A, 140B and 140C. It is possible to adopt, as separate members, members that are made of a material with strength lower than materials used for the front side member outer 2 and the front side member inner 3; or members that are made of a material with a thickness thinner than the thicknesses of the front side member outer 2 and the front side member inner 3.

For example, as illustrated in FIG. 9(a), the portions which are relevant to the fragile portions in the front side member inner 3 in a flat plate state are cut off, and separate members 142, 143 and 145 are welded to the cut-off portions. In addition, the front side member inner 3 may be configured as illustrated in FIG. 9(b). In an example in FIG. 9(b), the triangular separate members 142 and 143 are connected to connection portions 146. Accordingly, the separate members 142, 143 and connection portions 146 can be made as one piece. Accordingly, since the number of small pieces for the tailored blank welding can be reduced, manufacturing of the front side member inner 3 is facilitated.

The above-mentioned front side member 100 according to the second embodiment can have the same operation and effects as those of the front side member 1 according to the first embodiment.

Third Embodiment

A front side member 200 according to a third embodiment will be described with reference to FIGS. 10 and 11. The front side member 200 according to the third embodiment is different from the front side member 1 according to the first embodiment mainly in that a deformation-inducing portion 30 is formed to have a bent portion 240 and in that the middle portion MA and the rear portion RA are reinforced.

Figure 10:
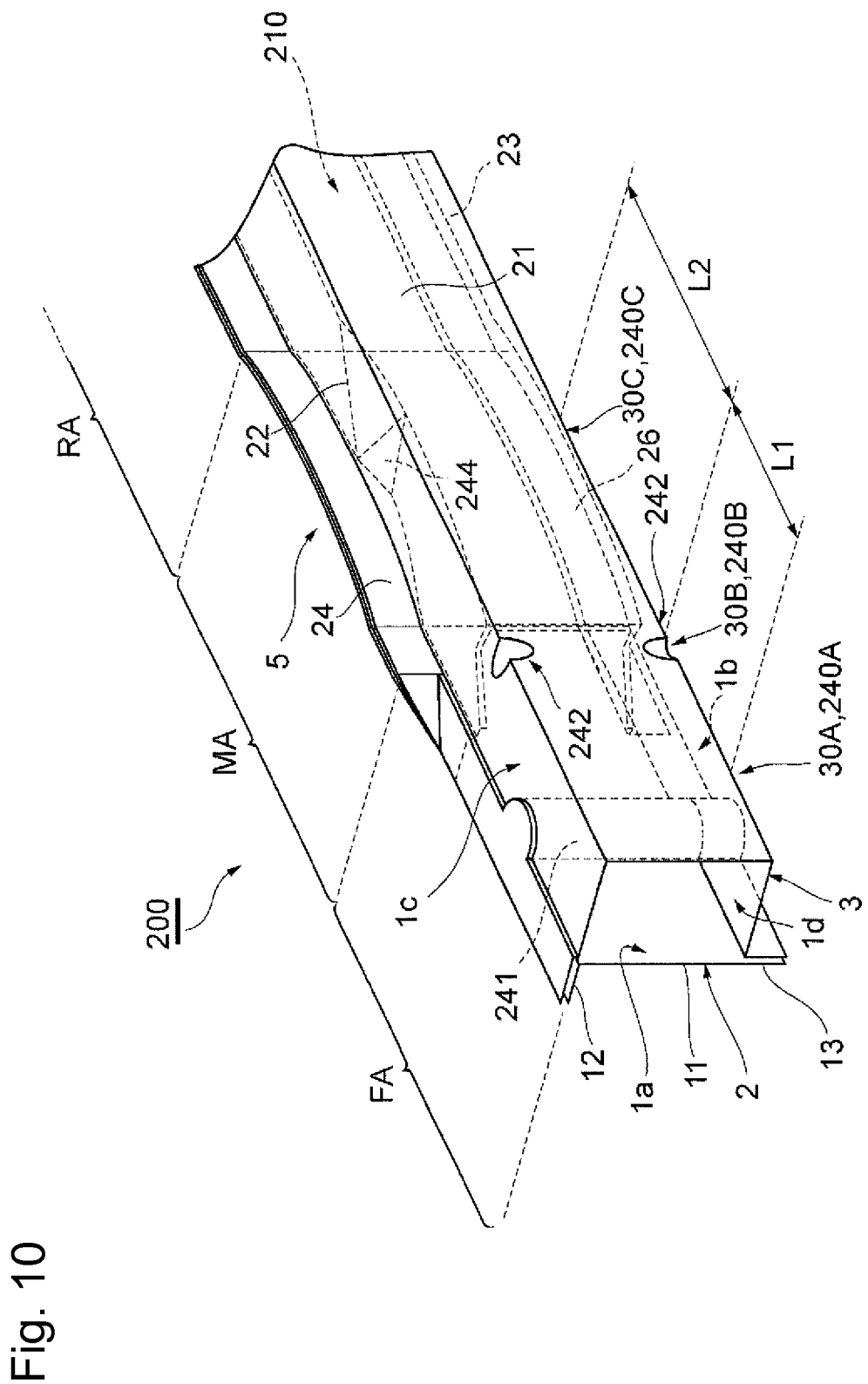
FIG. 10 is a perspective view illustrating a portion of a front side member according to a third embodiment.
Figure 11:
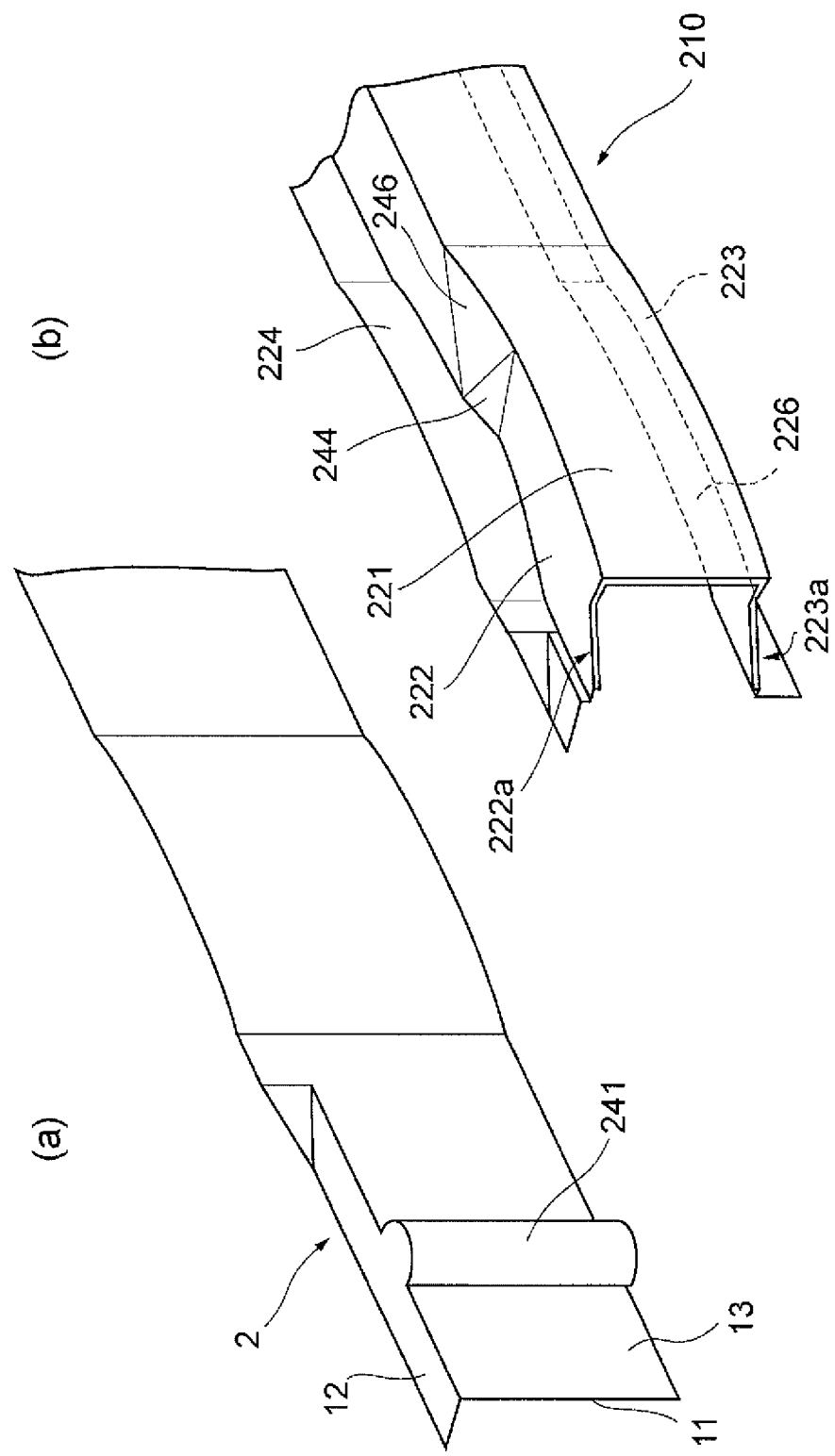
FIG. 11 shows perspective views illustrating configurations of a front side member outer and a reinforcement in FIG. 10.

As illustrated in FIGS. 10 and 11, the front side member 200 according to the third embodiment has a reinforcement 210 in addition to the front side member outer 2 and the front side member inner 3. In addition, the deformation-inducing portions 30A, 30B and 30C are configured to have bent portions 240A, 240B and 240C.

The reinforcement 210 is a member that reinforces the middle portion MA and the rear portion RA of the front side member 200 and is provided in an area inside the front side member 200. The reinforcement 210 has a shape which substantially matches an inner surface of the front side member inner 3. Specifically, the reinforcement 210 has a side portion 221 which reinforces the side wall portion 21; an upper wall portion 222 which reinforces the upper wall portion 22; a lower portion 223 which reinforces the lower wall portion 23; and flange portions 224 and 226 which reinforce the flange portions 24 and 26. The reinforcement 210 has protrusion portions 222a and 223a in a front end portion thereof, and the upper wall portion 222 and the lower portion 223 are protruded to the front of the vehicle to form the protrusion portions 222a and 223a. Outer sides of the upper wall portion 222 and the lower portion 223 are protruded to configure the protrusion portions 222a and 223a. Inner sides of the upper wall portion 222 and the lower portion 223 are not protruded. The front end portion (including the protrusion portions 222a and 223a) of the reinforcement 210 is bent to the inner side to form a flange portion 224, 226. In the above-mentioned configuration, the front side member 200 has a front-side area (mainly including the front portion FA) and a rear-side area (mainly including the middle portion MA and the rear portion RA) with strength higher than the front-side area in the front and rear direction of the vehicle. The rear-side area is a portion in which the reinforcement 210 is reinforced. In a boundary portion between the front-side area and the rear-side area, an outer side of the front side member 200 is reinforced by the protrusion portions 222a and 223a and an inner side thereof is not reinforced.

The deformation-inducing portions 30A and 30B are formed in the front-side area which is not reinforced. The deformation-inducing portion 30A is configured to have the bent portion 240A provided on the outer side. The bent portion 240A is configured to have a vertical bead 241 which is formed in the side wall portion 11 of the front side member outer 2. The vertical bead 241 has a shape which is caved to the inner side and is formed across the front side member outer 2 in the top and bottom direction of the vehicle. The front side member 200 is likely to be bent to the inner side due to the bent portion 240A. The deformation-inducing portion 30B is configured to have the bent portion 240B provided on the inner side. The bent portion 240B is configured to have beads 242 which are formed in the front side member inner 3. The beads 242 are formed in an angled portion between the side wall portion 21 and upper wall portion 22 of the front side member inner 3; and in an angled portion between the side wall portion 21 and the lower wall portion 23. The beads 242 have a shape which is caved to the outer side. The beads 242 are in the vicinity of the boundary portion between the front-side area and the rear-side area and are formed in portions in which the reinforcement 210 are not reinforced. That is, the beads 242 are arranged in a front of the front end portion of the reinforcement 210 in the front-side area of the front side member 200. As such, the beads 242 are formed in positions where strength is rapidly changed, and thus, bending is likely to occur in the bent portion 240B. The front side member 200 is likely to be bent to the outer side due to the bent portion 240B.

The deformation-inducing portion 30C is formed in the rear-side area which is reinforced. The deformation-inducing portion 30C is configured to have the bent portion 240C provided on an outer side of the reinforcement 210. The bent portion 240C is configured to have a sharp stepped portion 244 formed on the outer side of the upper wall portion 222 of the reinforcement 210. The upper wall portion 222 of the reinforcement 210 is separated downward from the upper wall portion 22 of the front side member inner 3 as the reinforcement 210 heads to the rear of the vehicle from the front end portion. The upper wall portion 222 is rapidly bent upward in a position where the bent portion 240C is located such that the upper wall portion 222 forms the stepped portion 244. The stepped portion 244 has an outer side which is the only side that is rapidly bent and an inner side that remains unbent. Accordingly, the stepped portion 244 has the shape of a triangle which has a base on the outer side and an apex on the inner side. A moderate stepped portion 246 is formed on the inner side. The stepped portion 246 has the shape of a triangle which has a base on an inner side and an apex on an outer side. The base of the stepped portion 246 is longer and is less sharply sloped than the base of the stepped portion 244. The upper wall portion 222 overlaps the upper wall portion 22 in the rear of the vehicle from the stepped portions 244 and 246. The front side member 200 is likely to be bent to the inner side due to the bent portion 240C.

The deformation-inducing portions 30D and 30E are also configured to have bent portions. However, only the deformation-inducing portions 30D and 30E may be configured to have fragile portions as illustrated in the first and second embodiments.

A dimensional inter-relation of the deformation-inducing portions 30A, 30B, 30C, 30D and 30E (relation such as the distances L1 and L2) is the same as dimensional relations in the first and second embodiments. Accordingly, the front side member 200 according to the third embodiment is also deformed in accordance with the orders of occurrences of the deformations, the phases of the deformations and the deformation modes as illustrated in FIG. 3 and FIGS. 5 to 7. Accordingly, the front side member 200 according to the third embodiment can have the same operation and effects as those of the first and second embodiments.

In the above-mentioned configuration, the front side member 200 has a front-side deformation-inducing portion formed in the front-side area which is not reinforced and, in the front-side deformation-inducing portion, a bending deformation is induced due to a load exerted from the front of the vehicle; and a rear-side deformation-inducing portion formed in the rear-side area with high strength and, in the rear-side deformation-inducing portion, a bending deformation is induced due to a load exerted from the front of the vehicle. The front-side deformation-inducing portion is configured to have the deformation-inducing portions 30A and 30B. The rear-side deformation-inducing portion is configured to have the deformation-inducing portion 30C. That is, the front-side deformation-inducing portion has the bent portions 240A and 240B which are formed on the outer side and the inner side, respectively, and the rear-side deformation-inducing portion has the bent portion 240C which is provided in the reinforcement 210 which reinforces the rear-side area.

When a load is exerted from the front side of the vehicle due to a front end collision, the front side member 200 is deformed toward the inner side in the deformation-inducing portion 30C (rear-side deformation-inducing portion) in the vicinity of the powertrain unit PTU, and the front side member 200 interferes with the powertrain unit PTU. At this time, the front side member 200 is deformed to be moved backward in the deformation-inducing portions 30A and 30B (front-side deformation-inducing portions) with low strength. That is, the amount of deformation can be ensured in the portion. In addition, a force is transmitted to a portion on the rear side of the front side member 200 by the deformation such that the front side member 200 can be pressed toward the rear of the vehicle. Accordingly, the amount of deformation can become also large in a portion on the rear side of the deformation-inducing portion 30C (rear-side deformation-inducing portion) which interferes with the powertrain unit PTU. As such, the amount of impact absorption can be sufficiently ensured. In addition, a deformation mode can be stabilized by an articulated deformation.

The present invention is not limited to the embodiments described above.

For example, in the above-mentioned embodiments, each of the deformation-inducing portions is configured to have only one type of the fragile portion 40, the fragile portion 140 and the bent portion 240. However, different types may be applied to a deformation-inducing portion and other deformation-inducing portions. That is, a front side member may have a structure where two or more types of the fragile portion 40, the fragile portion 140 and the bent portion 240 are mixed up.

In addition, five of the deformation-inducing portions are formed in a front side member. However, in particular, the number of deformation-inducing portions is not limited to five, and may be more or less than five. In addition, in particular, the position of the powertrain unit PTU is not specified.

A type of the deformation-inducing portion and a shape of the fragile portion are not limited to the embodiments described above, and various configurations can be adopted within a scope which does not depart from technical ideas of the present invention.

INDUSTRIAL APPLICABILITY

The present invention is applicable to a framework member that is extended in a front and rear direction of a vehicle in a front portion of the vehicle.

REFERENCE SIGNS LIST 1, 100, 200: FRONT SIDE MEMBER (FRAMEWORK MEMBER)
30A: DEFORMATION-INDUCING PORTION (FIRST DEFORMATION-INDUCING PORTION, FRONT SIDE DEFORMATION-INDUCING PORTION)
30B: DEFORMATION-INDUCING PORTION (SECOND DEFORMATION-INDUCING PORTION, FRONT SIDE DEFORMATION-INDUCING PORTION)
30C: DEFORMATION-INDUCING PORTION (THIRD DEFORMATION-INDUCING PORTION, REAR SIDE DEFORMATION-INDUCING PORTION)
30D, 30E: DEFORMATION-INDUCING PORTION
40A, 40B, 40C, 140A, 140B, 140C: FRAGILE PORTION
240A, 240B, 240C: BENT PORTION
210: REINFORCEMENT (REINFORCEMENT MEMBER)
PTU: POWERTRAIN UNIT

The invention claimed is:

1. A framework member that is extended in a front and rear direction of a vehicle in a front portion of the vehicle, the framework member comprising:
a plurality of deformation-inducing portions, in which deformations are induced by a load exerted on a front of the vehicle and which are formed at points in the framework member along the front and rear direction of the vehicle,
wherein the plurality of deformation-inducing portions are alternately formed on an outer side and an inner side of the framework member along the front and rear direction of the vehicle,
wherein the closer the deformation-inducting portion is positioned to a rear of the vehicle, the greater a distance between the deformation-inducing portions becomes,
wherein the deformation-inducing portion is formed in each of a front portion, a middle portion and a rear portion of the framework member, and
wherein deformations are induced in order of the middle portion, the front portion and the rear portion.

2. A framework member,
wherein a first deformation-inducing portion, a second deformation-inducing portion and a third deformation-inducing portion are formed in the framework member in order of ascending number from the front of the vehicle,
wherein the third deformation-inducing portion is arranged at a position which is adjacent to a powertrain unit in a width direction of the vehicle,
wherein the first deformation-inducing portion is formed on the outer side of the framework member, and the framework member is bent toward the inner side at a position where the first deformation-inducing member is located,
wherein the second deformation-inducing portion is formed on the inner side of the framework member, and the framework member is bent to the outer side at a position where the second deformation-inducing member is located, wherein the third deformation-inducing portion is formed on the outer side of the framework member, and the framework member is bent to the inner side at a position where the third deformation-inducing member is located, and
wherein a distance between the first deformation-inducing portion and the second deformation-inducing portion in the front and rear direction of the vehicle is smaller than a distance between the second deformation-inducing portion and the third deformation-inducing portion in the front and rear direction of the vehicle.

\* \* \* \* \*